United States Patent [19]
Chittor et al.

[11] Patent Number: 5,987,552
[45] Date of Patent: Nov. 16, 1999

[54] BUS PROTOCOL FOR ATOMIC TRANSACTIONS

[75] Inventors: Suresh Chittor; Suvansh Kapur; Lily Looi, all of Portland, Oreg.

[73] Assignee: Intel Corporation, Santa Clara, Calif.

[21] Appl. No.: 09/013,774

[22] Filed: Jan. 26, 1998

[51] Int. Cl.$^6$ .............. G06F 13/00; G06F 13/42

[52] U.S. Cl. .................. 710/128; 710/129; 709/100

[58] Field of Search ..................... 710/128, 108, 710/200, 112, 129, 101, 107, 126, 39, 36, 263, 52; 709/100, 300; 370/402, 412; 395/527; 712/28; 340/825.5

[56] References Cited

U.S. PATENT DOCUMENTS

| | | | |
|---|---|---|---|
| 5,548,780 | 8/1996 | Krein | 710/5 |
| 5,708,794 | 1/1998 | Parks et al. | 711/154 |
| 5,761,731 | 6/1998 | Doren et al. | 711/155 |
| 5,896,513 | 4/1999 | Fisch et al. | 395/527 |

*Primary Examiner*—Gopal C. Ray
*Attorney, Agent, or Firm*—Kenyon & Kenyon

[57] ABSTRACT

A method for processing an atomic transaction in a multi-bus system that includes a local bus and a remote bus. According to the method, a first transaction in an atomic sequence is received from the local bus. The first transaction is terminated on the local bus. The first transaction is performed on the remote bus. A response to the first transaction is received and the response is placed on the local bus.

28 Claims, 4 Drawing Sheets

5,987,552

BUS PROTOCOL FOR ATOMIC TRANSACTIONS

BACKGROUND OF THE INVENTION

The present invention relates to a bus system that supports atomic transactions in a multi-bus computer system.

Modern computer systems are multi-agent systems. One known system, shown in FIG. 1, includes a plurality of agents 10–50 that communicate with one another over a first communication bus 60. As agents evolved, different bus protocols developed to support them. Thus, additional sets of agents 72–78 and 82–88 communicate over other buses 70 and 80. The bus protocols often are not compatible with each other. Accordingly, although it has become common practice to provide several buses in a single computer system, the system may include at least one bridging agent, such as agent 50, that interfaces to the buses 60, 70 and 80.

In known computer systems, typically there only two different bus types in such systems. One or more central processors 10–40 communicate on a "local" bus 60. Input/output devices may communicate on a "remote" bus 70 or 80.

When an agent 10 must perform an operation to be implemented by an agent 72 of remote bus 70, it issues a bus transaction on the local bus 60. The bridging agent 50 fields the bus transaction, decodes it and issues a bus transaction on the remote bus 70. The agent 72 responds to the transaction on the remote bus 70 and issues a response to be carried back to agent 10. For example, when agent 10 requests data to be read from agent 72, agent 72 issues a response with the requested data. Bridging agent 50 carries the requested data back to agent 10 via the local bus 60. Typically, the bridging agent 50 queues requests and responses carried in either direction across the buses.

As a representative example, consider a computer system where bus 60 is based on the bus protocol of the Pentium® Pro processor, commercially available from Intel Corporation of Santa Clara, Calif. One or more agents 10–40 may be Pentium® Pro processors. In this case, the local bus 60 is a pipelined bus. I/O devices 72–78, 82–88 are provided on the remote buses 70, 80. The I/O devices 72–88, 82–88 may communicate using a different bus protocol, such as the known Peripheral Component Interface ("PCI") protocol. An I/O controller 50 supports both the Pentium® Pro bus protocol and the PCI bus protocol so that transactions issued on the local bus 60 may be implemented on the remote buses 70, 80. For example, a bridging interface 50 may be a model 82450SX OPB integrated circuit, also commercially available from Intel Corp., that supports both the Pentium® Pro and PCI bus protocols.

The number of different buses in a computer system is expected to rise to increase the number of transactions that may be completed simultaneously by the system. One multiple bus design is shown in FIG. 2. There, a plurality of agents 10–40 are provided on the local bus 60. A local bridging agent 100 interfaces the local bus 60 to one or more intermediate buses 200 and 210. Intermediate bus agents 300 and 310 may perform bridging functions as well; they may interface the intermediate buses 200 and 210 to remote buses 400, 410, 420 and 430. A remote bus such as bus 400 may connect to one or more remote agents 402, 404, 406 and 408. Only one intermediate bus 200 is shown in FIG. 2 between the local bus 60 and a remote bus 400; however, there may be two or more intermediate buses (not shown). By organizing the agents into a plurality of isolated buses, the number of transactions that may be implemented concurrently is increased.

The intermediate bus architecture of FIG. 2 also facilitates scalability. It permits more remote agents to be provided in a single computer system. Accordingly, the computer system is made more powerful.

The multi-bus design of FIG. 2, however, increases the delay of "remote" transaction, a transaction that is issued on a local bus that is directed to an agent of a remote bus. Instead of one bridging agent, a transaction traverses a plurality of bridging agents. Each time a request or a response traverses a bridging agent 100 or 300, the bridging agent fields the request or response from a local bus, decodes it, queues it internally and posts an associated request or response on another bus. Thus, the multi-bus design increases latency of remote transactions.

The performance advantages that are achieved by a multi-bus design may be impaired by a certain set of transactions known as "atomic transactions." Atomic transactions are known in the context of the system of FIG. 1. They occur when one agent issues a number of bus transactions that must be completed in sequence without interruption. Typically, the atomic transaction causes the agent's bus to be locked out against transactions that may be initiated by other agents of the bus. For example, if agent 10 issues an atomic transaction, the bus 60 is locked against other transactions that may be initiated by agents 20, 30 or 40. The bus remains locked until the final transaction in the atomic sequence is completed.

For atomic transactions that are "remote," the local bus 60 is locked during the entire time that it takes the atomic transaction to complete. The bus 60 is locked for the time that it takes the bridging agent 50 to field each request in the atomic sequence, translate it and issue it on bus 70. The bus also is locked for the time that it takes for each response to return from bus 70 to bus 60. As noted, the bridging agent 50 typically queues the requests and responses with other transactions received from the local and remote buses 60, 70. The time that the local bus 60 remains locked increases if the atomic transactions must sit idle in long queues at the bridging agent 50.

Atomic transactions can impair bus utilization and, if not implemented properly, cause system deadlock. In the two bus system of FIG. 1, however, because remote atomic transactions cross only a single bridging agent 50, the queuing delays imposed by the agent are not significant. In multi-bus systems such as the system of FIG. 2, a remote atomic transaction may cross two or more bridging agents. While the intermediate and remote buses 100, 400 process the transaction, the local bus 60 sits idle. However, because it is locked, no other agent can post a transaction. Accordingly, utilization of the local bus 60 suffers. Also, if system components do not permit the local bus to be locked, the system may deadlock. The risk of deadlock increases as the number of buses increases. There is a need in the art for a bus protocol that improves bus utilization during atomic transactions that span multiple buses in a computer system.

In the context of the two-bus system of FIG. 1, it is also known for remote agents to initiate lockout transactions. For example, many remote agents designed for use on remote bus 70 may issue request exclusive access to system memory 90. As a representative example, the PIIX3 and PIIX4 integrated circuits, commercially available from Intel Corp., post such lockout requests using the known PHOLD signaling on a PCI bus. Other types of lockout requests are known. The lockout transaction grants to the remote agent uninterrupted access to the memory 90.

In the multi-bus system, the number of remote buses may increase manifold. The system may be provided with so many remote agents that it becomes impractical to grant the remote agent a lockout. However, to provide backward compatibility to such remote agent the remote buses 400–430 should simulate the lockout. The simulated lockout should: 1) permit a remote agent to lock the remote bus 400, and 2) prevent other agents from posting transactions to the remote agent. Accordingly, there is a need in the art for a lockout protocol for remote initiated lockouts that simulate a remote agent's uninterrupted access to an agent on the local bus.

SUMMARY OF THE INVENTION

The present invention provides a method for processing an atomic transaction in a multi-bus system that includes a local bus and a remote bus. According to the method, a first transaction in an atomic sequence is received from the local bus. The first transaction is terminated on the local bus. The first transaction is performed on the remote bus. A response to the first transaction is received and the response is placed on the local bus.

DETAILED DESCRIPTION

The present invention provides a bridging agent that improves bus utilization for atomic transactions. In response to a first transaction in an atomic sequence, the bridging agent terminates the bus transaction as by, for example, issuing a RETRY or DEFER response thereto. The bridging agent, however, posts the transaction on the intermediate and remote buses and isolates the local bus from the intermediate and remote buses. Eventually, the intermediate and remote buses complete the first transaction. When the bus transaction is retried, the bridging agent completes the transaction. Thereafter, the local bus is locked. The sequence of atomic transactions proceeds without interruption.

Bus utilization is improved because other transactions may be completed on the local bus while the remote buses perform the first transaction of the atomic transaction sequence. Without the benefits of the present invention, the local bus would be locked from any transactions which the remote buses process the first transaction. By retrying or deferring the transaction, other agents on the local bus may issue transactions. Accordingly, utilization of the local bus is enhanced.

Throughout this discussion, reference will be made to outbound and inbound transactions to describe directions that various transaction data may take. An "outbound transaction" is one that is issued on the local bus by an agent that is to be responded by a destination agent on the intermediate bus or some remote bus. An outbound transaction is started by an outbound request, a message that propagates from the local bus through the bridging agent to the intermediate bus. The outbound transaction is answered by an outbound response, a message that propagates back to the local bus from the intermediate bus.

An "inbound transaction" is one that is issued on some remote bus, such as the intermediate or destination buses, that propagates to the local bus. The inbound transaction is started by an inbound request, a message that propagates toward the local bus through the bridging agent. The inbound transaction is answered by an inbound response, a message that propagates from the local bus to intermediate bus towards its destination.

Figure 2:
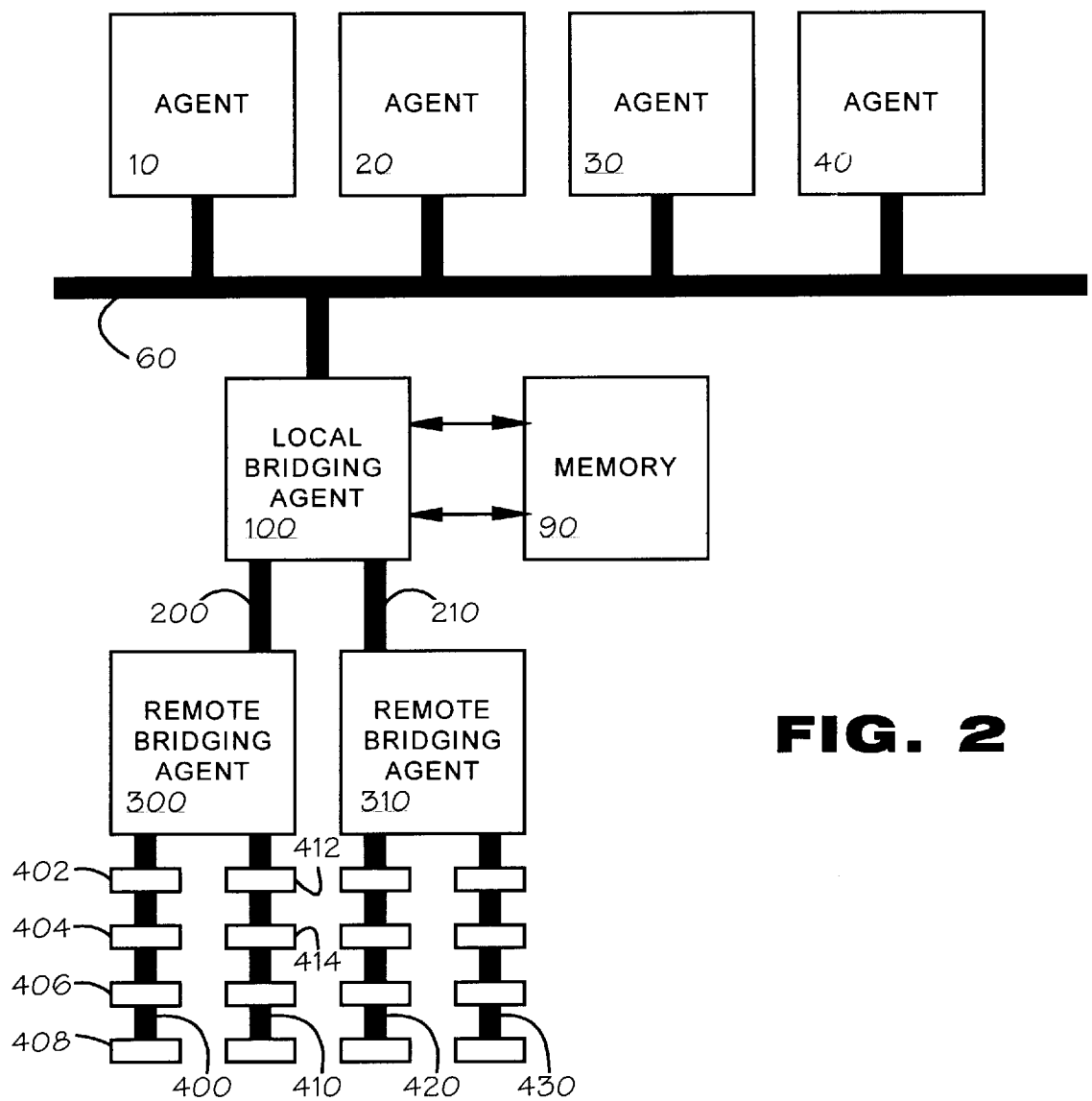
FIG. 2 is a block diagram of an improved multi-bus computer system.

Consider the multi-bus system of FIG. 2 in the context of an atomic transaction to be issued by agent 10. Agent 10 possesses a series of bus transactions to be implemented as an atomic transaction. The transactions are to be implemented by agent 402, for example. When agent 10 issues the first atomic transaction, it is observed by the bridging agent 100. The bridging agent 100 determines that it is directed to a remote agent via the intermediate bus 200 and that the transaction is a member of an atomic series. In response, the bridging agent 100 terminates the first transaction on the local bus 60. However, it performs the request on the intermediate bus 200. Because the transaction is terminated on the local bus, the local bus is not locked against bus transactions issued by other agents 20–40.

The bridging agent 100 determines that the transaction should be directed to intermediate bus 200. The bridging agent 100 outputs an outbound request on bus 200 using a signaling pattern that identifies the transaction as a locked transaction. Remote bridging agent 100 receives the transaction and queues it according to normal techniques. It issues the transaction on remote bus 400. When remote agent 402 responds to the transaction, remote bridging agent 300 isolates the bridging agent 100 from remote bus 400. It queues the response according to normal techniques. When the response advances out of queue, the remote bridging agent 300 outputs the response to intermediate bus 200 and locks other buses, such as bus 410, from the intermediate bus 200.

Locks engaged by bridging agent 300 prevent remote agents from issuing transactions that propagate through intermediate bus 200. However, they permit the remote agents to issue transactions that are confined to their respective remote buses. Thus, when remote bus 400 is locked, agent 404 can issue a transaction that will be fulfilled by agent 406. Similarly, when bus 410 is locked, agent 412 can begin a transaction to be fulfilled by agent 414. However, agent 412 could not access agent 20 because it would require a transaction to traverse the intermediate bus 200.

The response is received from the intermediate bus 200 by bridging agent 100. Bridging agent 100 queues the transaction according to normal techniques. When it decodes the response, bridging agent 100 also locks out any other intermediate buses. For example, when the response is received from intermediate bus 200, bridging agent 100 locks out intermediate bus 210. The lock out of intermediate bus 210 permits transactions to occur on remote buses 420 and 430 provided the transactions are confined to their respective buses.

When the response advances out of queue at the bridging agent 100, the requested data may be provided to issuing agent 10. If the bridging agent 100 responded to the original local bus transaction with a DEFER response, the bridging agent 100 begins a transaction on the local bus 60 and provides the requested data. The local bus 60 then becomes locked. If the bridging agent 100 originally responded with a RETRY response, it waits until the issuing agent 10 retries the atomic transaction. When the atomic transaction is retried, the bridging agent 100 responds to the transaction. The local bus 60 is locked thereafter.

The present invention also minimizes the time that is required to complete the atomic transaction. When the local bus is finally locked, the queues of the various bridging agents 100, 300 in the path between the issuing agent and the remote agent 402 have been flushed. Thus, a subsequent transaction in the atomic sequence that is received by a bridging agent is queued and processed immediately. Thus, the bridging agents 100, 300 do not impose unnecessary delay to the completion of the atomic transaction.

Figure 3:
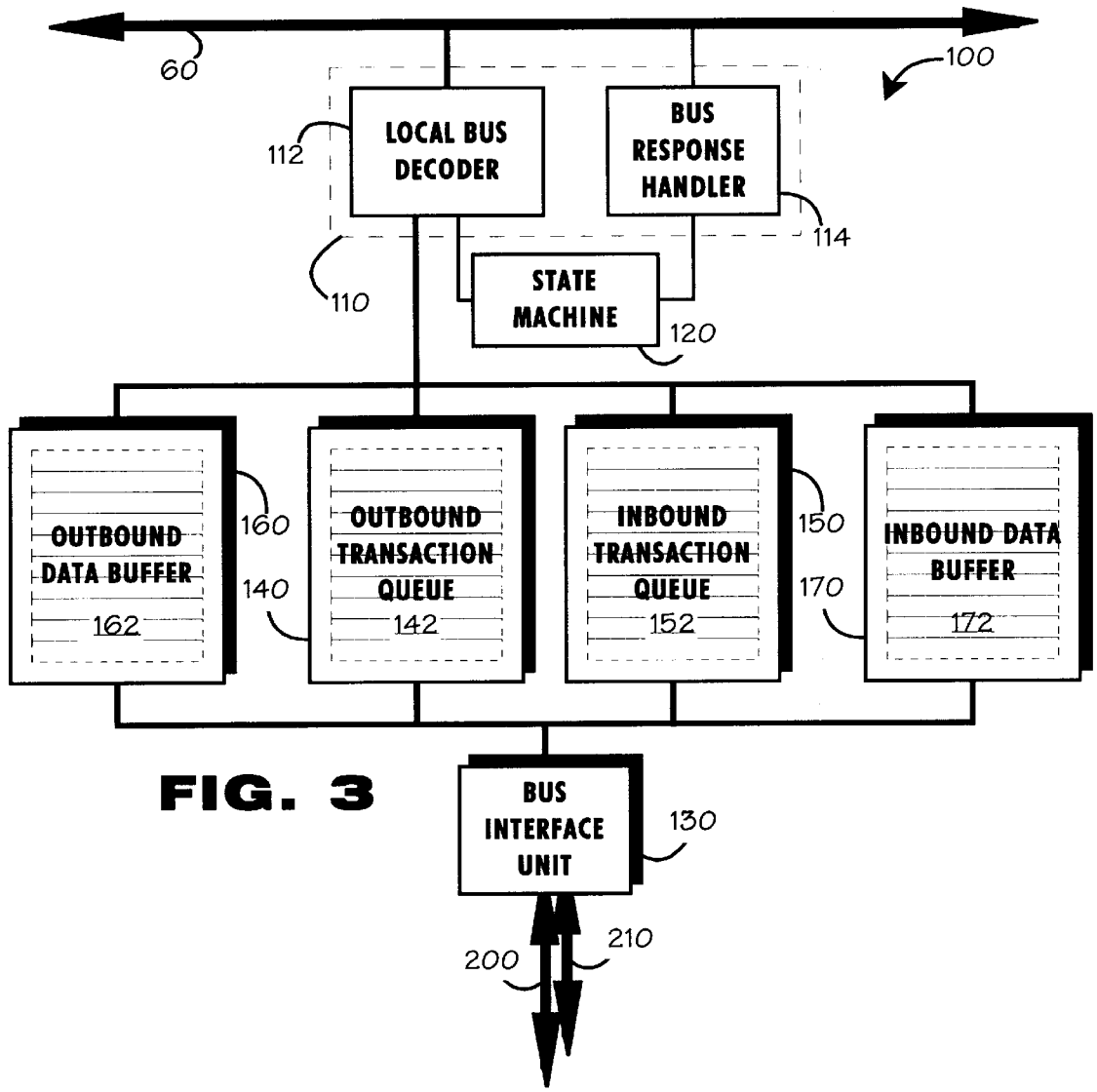
FIG. 3 is a block diagram of a local bridging agent constructed in accordance with an embodiment of the present invention.

FIG. 3 illustrates a bridging agent 100 constructed in accordance with an embodiment of the present invention. The bridging agent 100 interfaces with a local bus 60 at a local bus interface 110. The local bus interface 110 includes a local bus decoder 112 and a bus response handler 114. The local bus decoder 112 decodes transactions posted on the local bus 60 by other agents. The bus response handler 114 drives the pipelined bus 60 to respond to local bus transactions as necessary. A state machine 120 may control operation of the local bus interface 110 in certain circumstances described below.

The bridging agent 100 connects to intermediate bus 200 at an intermediate bus interface 130. The intermediate bus interface 130 decodes messages input to the bridging agent 100 from the in termediate bus 200 and generates messages output on the intermediate bus 200. The intermediate bus interface 130 is duplicated for each intermediate bus 200, 210 to which the bridging agent 100 is connected. The intermediate bus interface of bus 210 is shown in shadow in FIG. 3.

The bridging agent 100 is populated by an outbound transaction queue 140, an inbound transaction queue 150, an inbound data buffer 170 and an outbound data buffer 160. Each include a plurality of queue entries 142, 152, 172 and 162 and control logic (not shown) that controls reading and writing of data therein. The outbound transaction queue 140 stores outbound requests and inbound responses that propagate to the intermediate bus. Similarly, the inbound transaction queue 150 stores inbound requests and outbound responses. The inbound data buffer 170 stores data received from the intermediate bus 200 for delivery to the local bus 60. Typically, when data it received from the intermediate bus 200, the data is queued in the inbound data buffer 170. The outbound data buffer 160 stores data associated with outbound transactions. Administrative information related to the transaction is queued in the inbound transaction queue 150. Pointers stored in the inbound transaction queue 150 and outbound transaction queue 140 identify queue entries in the inbound data buffer 170 or outbound data buffer 160 respectively where the associated data is stored.

The following discussion describes the operation of the bridging agent 100 in response to a first transaction in an atomic sequence.

When an agent such as agent 10 begins an atomic transaction, it posts a request on the local bus 60. The decoder 112 observes the request. It determines that the request must be implemented via the intermediate bus 200 and also determines that the request is an atomic transaction. In response, the decoder 112 causes the state machine 120 to advance from an idle state (FIG. 4, step 1000) to a "lock in progress" state (Step 1010). The decoder 112 also queues the bus transaction in the outbound transaction queue 140. The transaction include an identifier, such as a marking bit, that identifies that the transaction is part of an atomic transaction.

In the lock in progress state, the state machine 120 causes the bus request handler 114 to generate a RETRY or a DEFER response on the local bus 60 in response to the first atomic transaction. RETRY responses are known on computer buses; they terminate a posted transaction and cause the issuing agent to retry the transaction at a later time. DEFER responses also are known; they terminate the posted transaction but indicate to the issuing agent that the responding agent (in this case, local bridging agent 100) will begin a later bus transaction that contains a response to the posted transaction. For example, if a read request were deferred, a responding agent would supply the requested data at a later time without requiring the issuing agent to re-post the read request.

Because the atomic transaction is terminated, the local bus 60 is not locked against other transactions. Other agents remain free to post local transactions.

While in the lock in progress state, the state machine 120 causes the bus response handler to issue RETRY responses to any other agent that posts a request to a remote agent. Thus, while a second agent 20 could not complete a transaction directed to a remote agent such as agent 132, the second agent could complete a local transaction such as a transaction that would be completed by agent 30. If the local bridging agent 100 also functions as a memory controller, local bus transactions can be made to memory.

The bridging agent 100 performs outbound transactions according to normal techniques. It flushes transactions from the outbound transaction queue 140 and posts outbound requests and inbound responses on the intermediate bus 200. Because the bridging agent 100 becomes locked against new remote transactions from the local bus 60, no other outbound requests may be queued in the outbound transaction queue 140 once the state machine enters the lock in progress state. The atomic transaction is the last outbound request to enter the outbound transaction queue 140. Inbound responses, responses to requests received from the intermediate bus, 100 may be entered in the outbound transaction queue 140 behind the atomic request.

When the atomic transaction advances out of the outbound transaction queue 140, it is input to the intermediate bus interface 130 where it is formatted and output on the intermediate bus 200.

Figure 4:
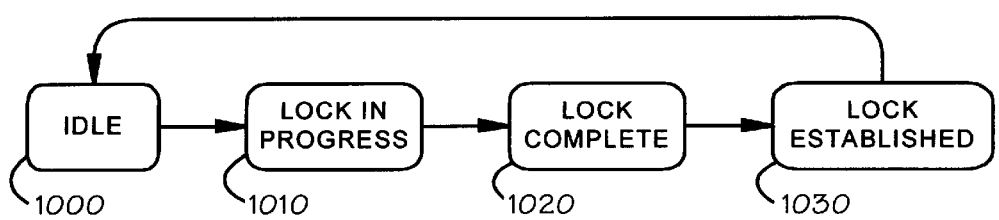
FIG. 4 is a state diagram illustrating operation of an embodiment of the state machine of FIG. 3.

At some later time, a response to the first atomic transaction is received from the intermediate bus 200. The intermediate bus interface 130 decodes the response and queues it in the inbound transaction queue 150. If the response includes data pursuant to of a read request, the data is queued in the inbound data buffer 170. When the response is queued, the state machine 120 enters a "lock complete" state (FIG. 4, Step 1020).

When the response advances to the head of the inbound transaction queue 150, the local bus decoder 112 causes any other intermediate buses, such as bus 210, to be isolated from the local bus 60.

The behavior of the bridging agent 100 in the lock complete state depends on whether the state machine 120 caused the bus response handler 114 to issue a RETRY or DEFER response to the first atomic transaction. In both events, the local bridging agent 100 provides the issuing agent with a response to the first atomic transaction and the local bus 60 becomes locked. When the local bus 60 is locked, the state machine 120 advances to the "lock established" state (FIG. 4, Step 1030).

Figure 1:
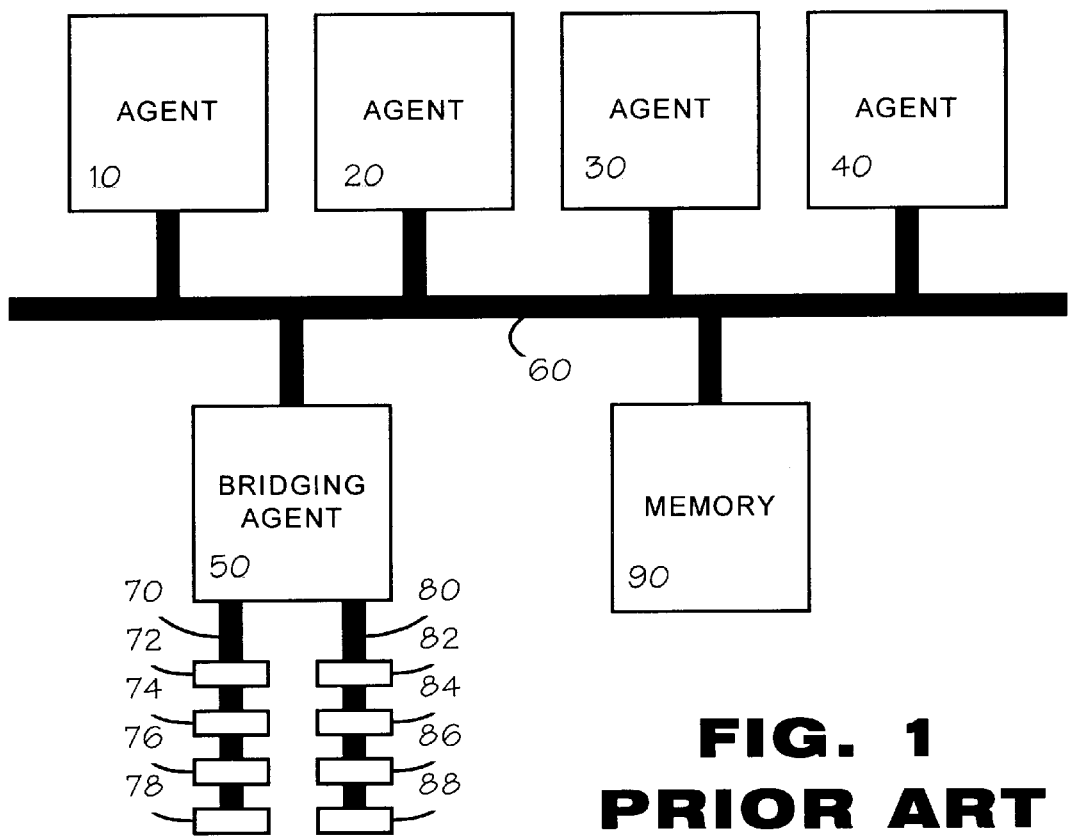
FIG. 1 is a block diagram of a known multi-bus computer system.

If a RETRY response were issued, the state machine 120 allows the one agent that issued the atomic transaction to issue a remote transaction. The transaction will be the first atomic transaction retried. Thus, when agent 10 (FIG. 1) retries the first transaction of the atomic sequence, the bridging agent 100 provides the queued response in response to the transaction. The lock becomes established.

If a DEFER response were issued, the state machine 120 causes the bus response handler 114 to begin a transaction that provides the response to the first atomic transaction. The first agent receives the response and locks the local bus 60. The lock becomes established.

In the lock established state, the locked status of the local bus 60 prevents other agents 20–40 from issuing transactions on the local bus 60. The state machine 120 permits the first agent 10 to post transactions to the remote agent (such as agent 402). When the first agent 10 releases the lock of the local bus 60, the state machine 120 returns to the idle state (FIG. 4, Step 1000).

Thus, the bridging agent 100 increases utilization of the local bus 60 when atomic transactions are posted. The bridging agent 100 terminates the atomic transaction on the local bus 60 but posts the transaction on the intermediate bus 200. Thus, the bridging agent 100 increases utilization of the local bus 60.

It should be noted that the bridging agent 100 isolates the local bus 60 from the intermediate buses 200, 210 when the state machine 120 enters the lock in progress state. This prevents other transactions from being queued in the outbound transaction queue 140 behind the first atomic transaction. Further, when the response to the first atomic transaction is queued, all intermediate buses 200, 210 are locked out against transactions that cross to the local bus 60. This prevents transactions from being queued in the inbound transaction queue 150 behind the response to the first atomic transaction. Thus, for subsequent transactions in the atomic sequence, the outbound and inbound transaction queues of the bridging agent 100 will be empty of queued transactions. The subsequent atomic transactions, both requests and responses, will be processed almost immediately. Thus, the lockout system of the local bridging agent 100 reduces overall latency of the atomic transaction.

Figure 5:
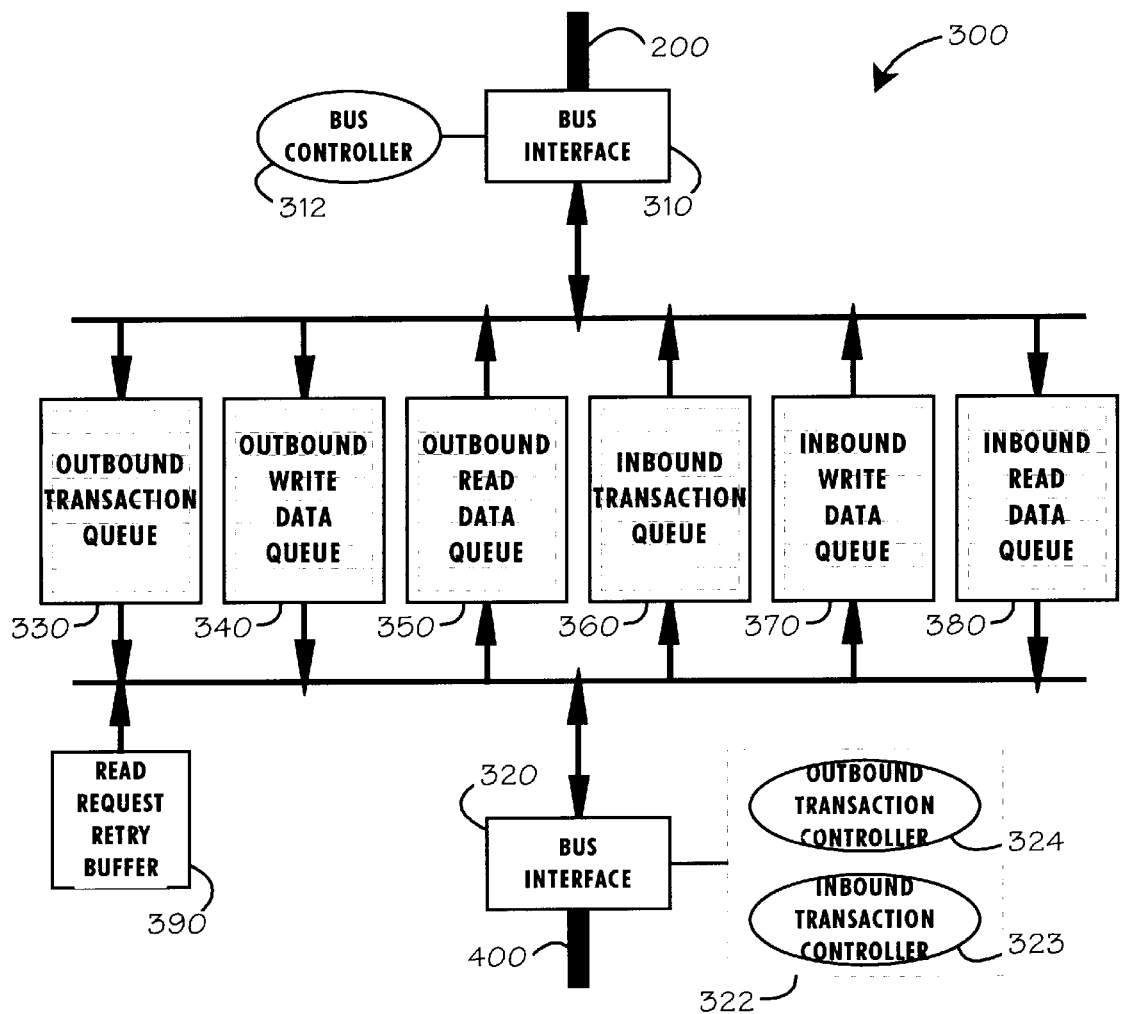
FIG. 5 is a block diagram of a remote bridging agent constructed in accordance with an embodiment of the present invention.

FIG. 5 illustrates the structure of a remote bridging agent 300 constructed in accordance with an embodiment of the present invention. The remote bridging agent 300 connects to the intermediate bus 200 at an intermediate bus interface 310. The intermediate bus interface 310 decodes messages sent to the remote bridging agent 300 over the intermediate bus 200. It also formate messages to be output from the remote bridging agent 300 on the intermediate bus 200. The intermediate bus interface 310 is controlled by an intermediate interface controller 312.

The remote bridging agent 300 connects to remote bus 400 via a remote bus interface 320. The remote bus interface controller 322 decodes messages sent to the remote bridging agent 300 over the remote bus 400. The remote bus interface 320 operates under control of a remote interface controller 322 which includes an outbound transaction controller 323 and an inbound transaction controller 324. The remote bus interface 320 is duplicated for each remote bus 400, 410 to which the remote bridging agent 300 is connected.

The remote bridging agent 300 is populated by a number of transaction queues. They include an outbound transaction queue 330, outbound write data queue 340, outbound read data queue 350, inbound transaction queue 360, inbound write data queue 370, inbound read data queue 380 and a read request retry buffer 390.

During normal operation, outbound requests are received from the intermediate bus 200 and queued in the outbound transaction queue 330. If the outbound transaction is a write transaction, accompanying write data is queued in the outbound write data queue 340. Also, inbound responses may be received from the intermediate bus 200 and queued in the outbound transaction queue 330. Accompanying read data is queued in the inbound read data queue 380. Transactions that advance out of the outbound transaction queue 330 are formatted by the remote bus and posted on the remote bus 400.

Outbound read requests that are posted on the remote bus 400 may be answered with a RETRY or DEFER response. Such responses are detected and decoded by the remote bus interface 320. In response, the outbound transaction controller 323 queues the outbound read request in the read request retry buffer 390. When transactions are queued in the read request retry buffer 390, the outbound transaction controller 323 retrieves a queued transaction therefrom on a regular and posts it on the remote bus 400.

Also during normal operation, inbound requests are received from the remote bus and queued in the inbound transaction queue 360. For inbound write requests, accompanying write data is buffered in the inbound write data queue 370. Outbound responses also are received from the remote bus and queued in the inbound transaction queue 360. Any read data accompanying the outbound response is queued in the outbound read data queue 350. Transactions that advance out of the inbound transaction queue 360 are formatted by the intermediate bus interface 310 and posted on the intermediate bus 200.

When the remote bridging agent receives the first atomic transaction, the intermediate bus interface 310 decodes the transaction according to normal procedures and queues the transaction in the outbound transaction queue 330. Eventually, the transaction reaches the head of the outbound transaction queue 330. The outbound transaction controller 323 posts the transaction on the remote bus 400.

By the time that the atomic transaction reaches the head of the outbound transaction queue 330, all other requests in the queue 330 will have been flushed. All write requests will have been posted on the remote bus 400 and are guaranteed to complete. All read requests will have been posted on the remote bus 400. They are not guaranteed to complete. If they do not complete because, for example, an agent responds with a RETRY or a DEFER response, the read requests will be queued in the read retry buffer 390. When the atomic transaction is posted on the remote bus 400, the outbound transaction controller 323 determines whether an agent issues a RETRY or DEFER response to the atomic transaction. If not, the outbound transaction controller 323 stalls transactions in the read request retry buffer 390. Thus, the outbound transaction controller 323 guarantees that the atomic transaction is the last request to be issued on the remote bus 400.

The remote bridging agent 300 receives and decodes a response to first atomic transaction. It queues the response in the inbound transaction queue 360 and, as necessary, the outbound read queue 350. When the remote interface controller 322 decodes the response, it locks the remote bus 400 against transactions that would cross to the intermediate bus 200. That is, the inbound transaction controller 324 issues a RETRY response to any new transaction on the remote bus 400 that would cross to the intermediate bus 200. For transactions contained entirely within the remote bus 400, the remote bridging agent 300 does nothing to prevent the transaction from proceeding.

The response to the atomic transaction advances out of the inbound transaction queue 360. When it does, the intermediate bus interface 310 formats the response and outputs it on the intermediate bus 200. The intermediate bus controller 312 causes the other remote buses, such as bus 410, to be isolated from the intermediate bus 200. Thus, no inbound requests are queued in the inbound transaction queue 360 after the outbound response is queued.

In a manner similar to the local bridging agent 100, the remote bridging agent 300 also minimizes latency of subsequent transactions in the atomic sequence. Once the first atomic transaction is flushed from the outbound transaction queue 330, the lockout imposed by the local bridging agent 100 prevents the remote bridging agent from receiving new requests. Further, the lockout of remote buses 400, 410 prevents new requests from being queued at the inbound transaction queue 360. The absence of new requests in the remote bridging agent 300 improves the speed at which the remote bridging agent 300 implements the atomic transaction.

In a second embodiment of the present invention, the local and remote bridging agents 100, 300 may be adapted to process remote agent initiated lock outs. Turning to FIG. 2, remote agent 412 initiates a request for uninterrupted access to system memory. The present invention supports the remote agent initiated lock out by simulating a remote agent's uninterrupted access to system memory. However, the system memory is not truly locked out from other agents. Also, when the uninterrupted access is simulated, the lock out prevents any other agent from completing transactions directed to remote agent 412.

According to the lockout protocol, remote agent 412 posts a transaction request on remote bus 410 for the uninterrupted access. The remote bridging agent 300 fields the request and posts a transaction on the intermediate bus 200. The local bridging agent 100 receives the request. Responsive to the request, the local bridging agent 100 locks out the local bus 60 from the remote agent 412. With the lock enabled, the local bridging agent 100 responds to any transaction posted on the local bus that references the one agent 412 with a RETRY response. The local bridging agent 100 also issues a response on intermediate bus 200 indicating that the requested lock out was successfully engaged.

In some implementations, when a local bridging agent 100 decodes a remote transaction posted on the local bus 60, it may identify only the remote bus to which the transaction is directed. It may not identify which agent on the bus is the destination of the transaction. In such cases, the local bridging agent 100 locks out the entire bus unless a posted transaction indicates that the transaction is not directed to the locking agent. For example, as noted, only older model remote agents such as the PIIX3 and PIIX4 circuits request such lockouts. The older remote agents may not support all transaction types. If the local bridging agent 100 receives a transaction type that cannot be fielded by the older remote agent, it may permit the transaction to proceed.

The remote bridging agent 300 receives and decodes the response. It posts a transaction on the remote bus 410 indicating that the lock out requested by the remote agent 412 is granted. Typically, the remote agent 412 asserts a lock on the remote bus 410 that prohibits any other remote agent such as 414 from initiating a transaction on the bus 410. For example, if the remote bus 410 were a PCI bus, the remote agent would assert a PHOLD# pin on the PCI bus to assert the lock.

The lockout of the present invention may be integrated with the known "passive release" techniques of PCI and other buses. According to the passive release, the remote agent may de-assert the PHOLD# for a single clock cycle on the remote bus 410. Other agents on the remote bus 410 are permitted to post a transaction during the passive release. However, the first remote agent 412, the one with granted access to system memory, can reclaim ownership of the remote bus 410 at any time.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. In a multi-bus computer system, having a local bus and a remote bus, a method of processing an atomic transaction posted on the local bus, comprising:

receiving a first transaction in an atomic sequence, terminating the first transaction on the local bus, performing the first transaction on the remote bus, receiving a response to the first transaction, and placing the response on the local bus.

2. The method of claim 1, further comprising a step of, coincident with the performing step, isolating the local bus from the remote bus.

3. The method of claim 1, wherein the terminating step includes generating a RETRY signal on the local bus in response to the first transaction.

4. The method of claim 1, wherein the terminating step includes generating a DEFER signal on the local bus in response to the first transaction.

5. The method of claim 1, further comprising a step of coincident with the second receiving step, isolating the remote bus from the local bus.

6. The method of claim 1, further comprising, subsequent to the placing step, receiving and performing all subsequent transactions in the atomic sequence.

7. In a multi-bus computer system, having a local bus and a plurality of remote buses, a method of processing an atomic transaction posted on the local bus, comprising:

receiving a first transaction in an atomic sequence, the first transaction being directed to one of the remote buses, terminating the first transaction on the local bus, performing the first transaction on the one remote bus, isolating the local bus from the remote bus, receiving a response to the first transaction, isolating the other remote buses from the local bus, and placing the response on the local bus.

8. The method of claim 7, wherein the first isolating step includes a step of, when a new transaction directed to any remote bus is posted on the local bus, terminating the new transaction.

9. The method of claim 7, wherein the second isolating step includes a step of, when a new transaction directed to the local bus is posted on any remote bus, terminating the new transaction.

10. The method of claim 7, wherein the terminating step includes generating a RETRY signal on the local bus in response to the first transaction.

11. The method of claim 7, wherein the terminating step includes generating a DEFER signal on the local bus in response to the first transaction.

12. In a multi-bus computer system that includes a local bus, an intermediate bus and a remote bus, a method of processing an atomic transaction in a local bridging agent that interfaces to the local bus and the intermediate bus, comprising:

receiving from the local bus a first transaction in an atomic sequence, the first transaction directed to the remote bus, terminating the first transaction on the local bus, placing the first transaction on the intermediate bus, receiving a response to the first transaction from the intermediate bus, and placing the response on the local bus.

13. The method of claim 12, further comprising a step of, coincident with the terminating step, isolating the local bus from the remote bus.

14. The method of claim 13, wherein the isolating step includes a step of, when any new transaction directed to the remote bus is posted on the local bus, terminating the new transaction.

15. The method of claim 12, further comprising steps of, without interruption:

receiving subsequent transactions in the atomic sequence from the local bus, placing the subsequent transaction on the intermediate bus, receiving responses to the subsequent transaction from the intermediate bus, and placing the responses on the local bus.

16. The method of claim 12, wherein the terminating step includes generating a RETRY signal on the local bus in response to the first transaction.

17. The method of claim 12, wherein the terminating step includes generating a DEFER signal on the local bus in response to the first transaction.

18. In a multi-bus computer system that includes a local bus, an intermediate bus and a remote bus, a method of processing an atomic transaction in a remote bridging agent that interfaces to the intermediate bus and the remote bus, comprising:

receiving from the intermediate bus a request corresponding to a first transaction in an atomic sequence, placing the request on the remote bus, receiving a response to the request from the remote bus, isolating the remote bus from the intermediate bus, and placing the response on the intermediate bus.

19. The method of claim 18, wherein the remote bridging agent interfaces to a plurality of remote buses and the isolating step includes a step of isolating all remote buses from the intermediate bus.

20. The method of claim 18, wherein the isolating step includes a step of, for any new transaction posted on the remote bus that is directed to the local bus, terminating the transaction.

21. A local bridging agent coupled to a local bus and to an intermediate bus, comprising:

a local bus interface coupled to the local bus, a local interface controller in communication with the local bus interface, an intermediate bus interface coupled to the intermediate bus, an inbound transaction queue in communication with the local bus interface and the intermediate bus interface, an outbound transaction queue in communication with the local bus interface and the intermediate bus interface, wherein, responsive to a first transaction in an atomic sequence:

the local interface controller enters a first state wherein it causes the local bus interface to generate a response on the local bus terminating the first transaction and every other remote transaction posted on the local bus subsequent to the first transaction, the first transaction is queued in the outbound transaction queue, when the first transaction advances out of the outbound transaction queue, the intermediate bus interface posts it on the intermediate bus, the intermediate bus interface receives a response to the first transaction, the response is queued in the inbound transaction queue, when the response advances out of the inbound transaction queue, the local interface controller enters a second state wherein, when the first transaction is retried, it causes the local bus interface to place the response on the local bus.

22. The local bridging agent of claim 21, wherein when the response is posted on the local bus, the local interface controller enters a third state wherein it permits transactions directed to remote buses to be posted on the local bus.

23. The local bridging agent of claim 21, the agent further comprising a second intermediate bus interface coupled to a second intermediate bus, wherein, when the response is received at the first intermediate bus, the second intermediate bus interface locks the second intermediate bus from the local bus.

24. A remote bridging agent coupled to an intermediate bus and a remote bus, comprising:

an intermediate bus interface coupled to the intermediate bus, a remote bus interface coupled to the remote bus, the remote bus interface including a remote bus controller, an outbound transaction queue coupled to the intermediate bus interface and the remote bus interface, an inbound transaction queue coupled to the intermediate bus interface and the remote bus interface, wherein, responsive to a request from the intermediate bus corresponding to a first transaction in an atomic sequence:

the intermediate bus interface queues the request in the outbound transaction queue, when the request advances out of the outbound transaction queue, the remote bus interface posts the request on the remote bus, the remote bus interface receives a response to the request and queues it in the inbound transaction queue, responsive to the response, the remote bus controller locking the remote bus from the intermediate bus, when the response advances out of the inbound transaction queue, the intermediate bus interfaces posts the response on the intermediate bus.

25. The remote bridging agent of claim 24, further comprising a remote request retry buffer coupled to the remote bus interface, that stores other requests to be retried on the remote bus, wherein, when the request is posted on the remote bus, the remote bus controller stalls the remote request retry buffer.

26. In a multi-bus system including a local bus, an intermediate bus and a remote bus, the system further including a local bridging agent interfacing the local bus to the intermediate bus and a remote bridging agent interfacing the intermediate bus to the remote bus, a method of implementing a lockout initiated by an agent on the remote bus, comprising:

receiving a lockout request from the intermediate bus, decoding the lockout request, isolating the local bus from the remote bus, and posting a response on the intermediate bus indicating that the lockout request is granted.

27. The method of claim 26, wherein the isolating step includes a step of, when a transaction is posted on the local bus and directed to the agent on the remote bus, terminating the transaction.

28. The method of claim 26, wherein the isolating step includes a step of, when a transaction is posted on the remote bus and directed to the agent on the remote bus, terminating the transaction.

* * * * *